(12) United States Patent
Alcantara

(10) Patent No.: US 6,926,257 B1
(45) Date of Patent: Aug. 9, 2005

(54) ROLLABLE CONDUIT DEVICE

(76) Inventor: Samuel E. Alcantara, 14106 SW. 121 Pl., Miami, FL (US) 33186

( * ) Notice: Subject to any disclaimer, the term of this patent is extended or adjusted under 35 U.S.C. 154(b) by 209 days.

(21) Appl. No.: 10/405,281

(22) Filed: Apr. 3, 2003

(51) Int. Cl.$^7$ .............................................. F21C 29/16
(52) U.S. Cl. ......................................... 254/134.3 FT
(58) Field of Search .............................. 254/134.3 FT, 254/134.3 R, 134.3 PA

(56) References Cited

U.S. PATENT DOCUMENTS

| | | | |
|---|---|---|---|
| 458,855 A * | 9/1891 | Meinzer | 254/395 |
| 1,514,612 A | 11/1924 | Glasgow | |
| 2,422,353 A * | 6/1947 | Hitt | 242/157 R |
| 2,816,734 A * | 12/1957 | Crofoot | 242/615.2 |
| 3,201,090 A | 8/1965 | Jones | |
| 3,441,189 A | 4/1969 | Erb et al. | |
| 4,600,176 A | 7/1986 | Ludwigs | |
| 5,029,817 A | 7/1991 | Tamm | |
| D418,210 S | 12/1999 | Roesch | |

* cited by examiner

Primary Examiner—Robert C. Watson

(57) ABSTRACT

A rollable conduit device for enabling the pulling of electrical wires through a tubular conduit without having to apply lubrication in the tubular conduit. The rollable conduit device includes a tubular conduit member having open ends and a bore being disposed therethrough, and also having a selected thickness, and further having a plurality of holes being disposed through a wall thereof; and also includes rollable assemblies being disposed in the holes of the tubular conduit member for facilitating moving objects through the bore of the tubular conduit member.

2 Claims, 4 Drawing Sheets

ROLLABLE CONDUIT DEVICE

BACKGROUND OF THE INVENTION

1. Field of the Invention

The present invention relates to rollable conduits and more particularly pertains to a new rollable conduit device for enabling the pulling of electrical wires through a tubular conduit without having to apply lubrication in the tubular conduit. Disclosure documents (#497090 & #502767) were filed in the U.S. Patent Office on Jul. 16, 2001 & Oct. 22, 2001 respectively for the present invention.

2. Description of the Prior Art

The use of rollable conduits is known in the prior art. More specifically, rollable conduits heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,441,189; U.S. Pat. No. 1,514,612; U.S. Pat. No. 3,201,090; U.S. Pat. No. 5,029,817; U.S. Pat. No. 4,600,176; and U.S. Pat. No. Des. 418,210.

While these devices fulfill their respective, particular objectives and requirements, the aforementioned patents do not disclose a new rollable conduit device. The prior art includes tubular conduits having open ends and bores disposed therethrough.

SUMMARY OF THE INVENTION

The general purpose of the present invention, which will be described subsequently in greater detail, is to provide a new rollable conduit device which has many of the advantages of the rollable conduits mentioned heretofore and many novel features that result in a new rollable conduit device which is not anticipated, rendered obvious, suggested, or even implied by any of the prior art rollable conduits, either alone or in any combination thereof. The present invention includes a tubular conduit member having open ends and a bore being disposed therethrough, and also having a selected thickness, and further having a plurality of holes being disposed through a wall thereof; and also includes rollable assemblies being disposed in the holes of the tubular conduit member for facilitating moving objects through the bore of the tubular conduit member. None of the prior art includes the combination of the elements of the present invention.

There has thus been outlined, rather broadly, the more important features of the rollable conduit device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new rollable conduit device which has many of the advantages of the rollable conduits mentioned heretofore and many novel features that result in a new rollable conduit device which is not anticipated, rendered obvious, suggested, or even implied by any of the prior art rollable conduits, either alone or in any combination thereof.

Still another object of the present invention is to provide a new rollable conduit device for enabling the pulling of electrical wires through a tubular conduit without having to apply lubrication in the tubular conduit.

Still yet another object of the present invention is to provide a new rollable conduit device that is easy and convenient to use.

Even still another object of the present invention is to provide a new rollable conduit device that reduces the amount of stress placed on wires as they are pulled through the tubular conduit thus possibly breaking one or more the wires.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
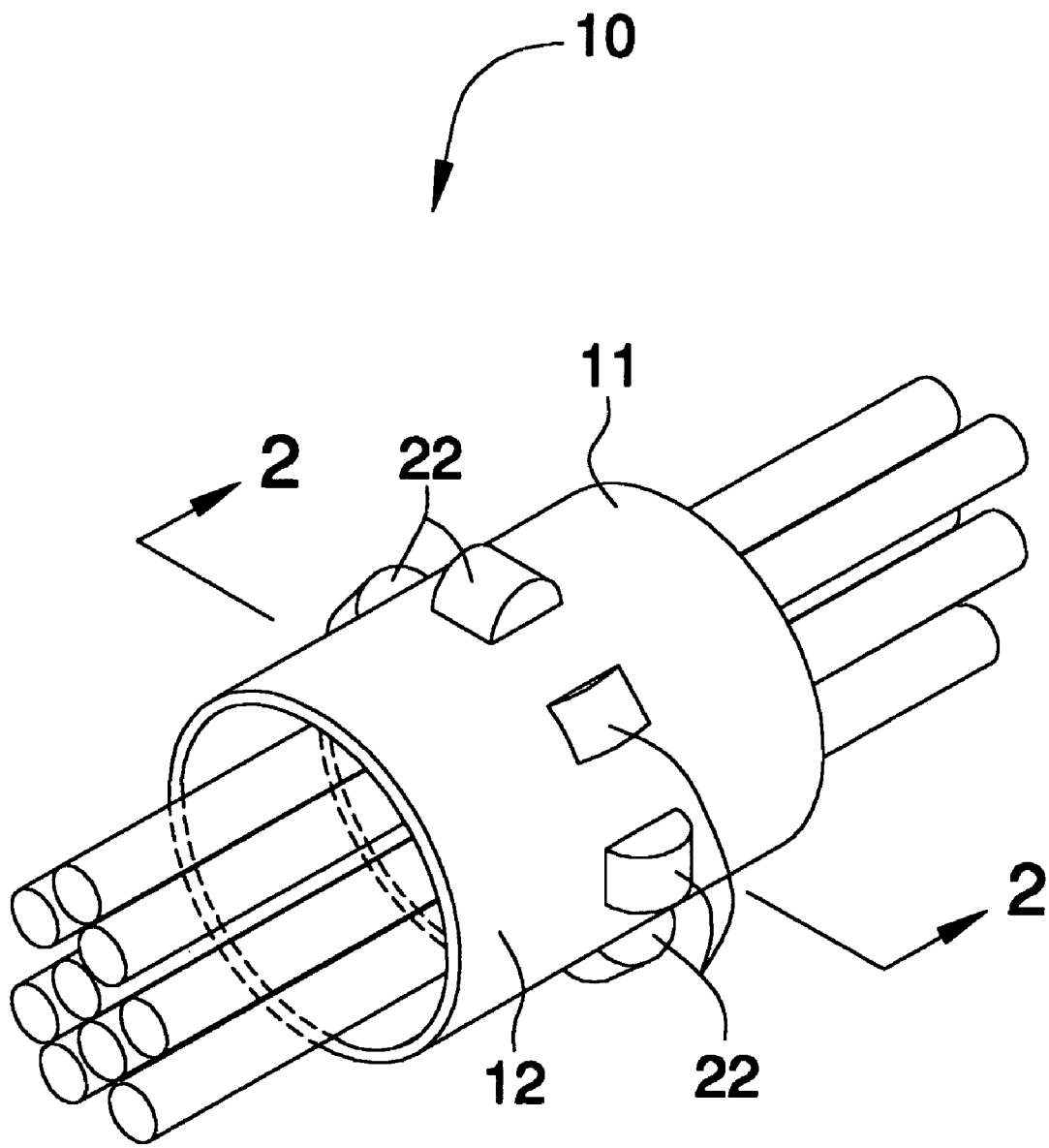
FIG. 1 is a perspective view of a new rollable conduit device according to the present invention.
Figure 2:
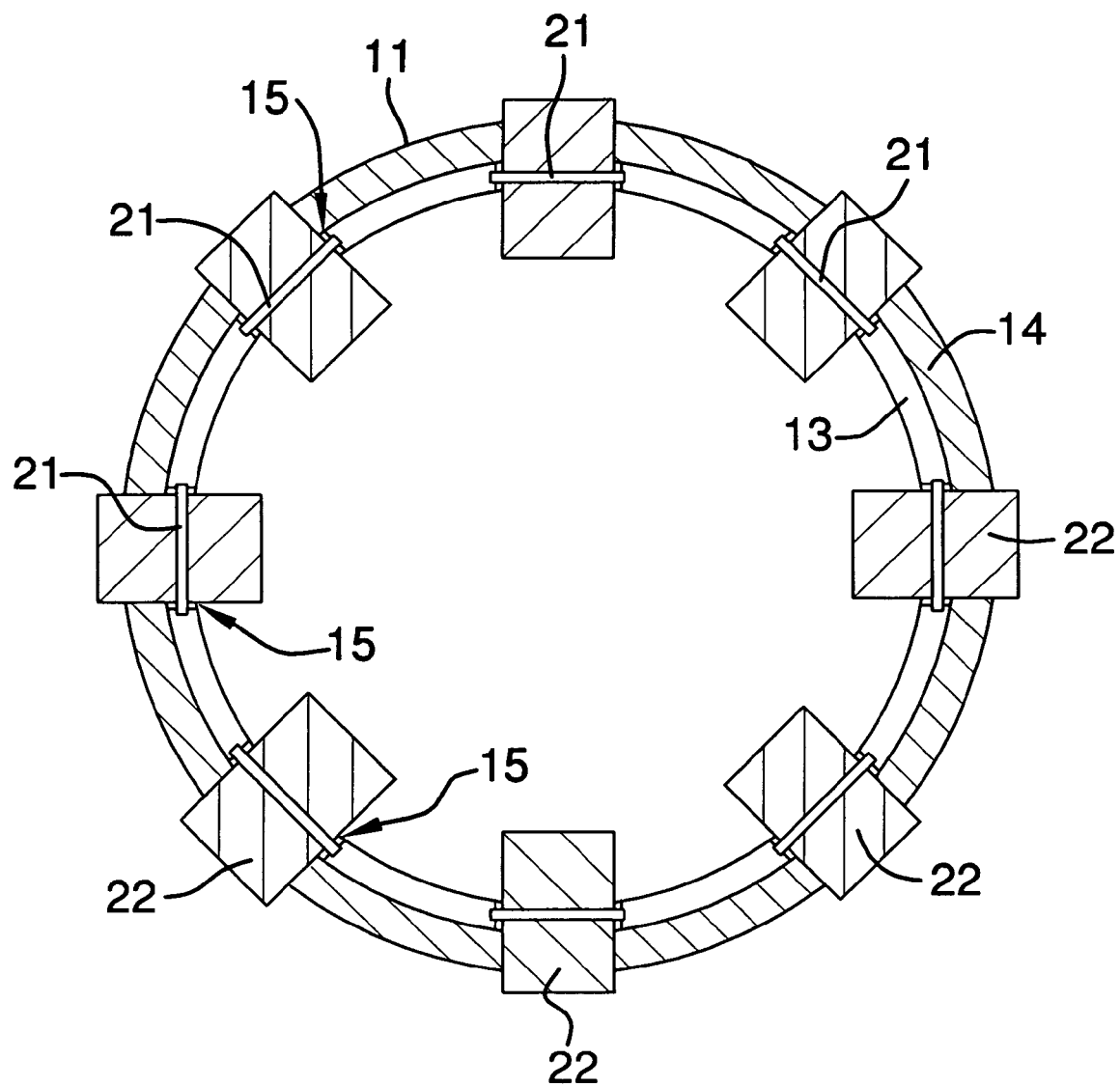
FIG. 2 is a lateral cross-sectional view of the present invention.
Figure 3:
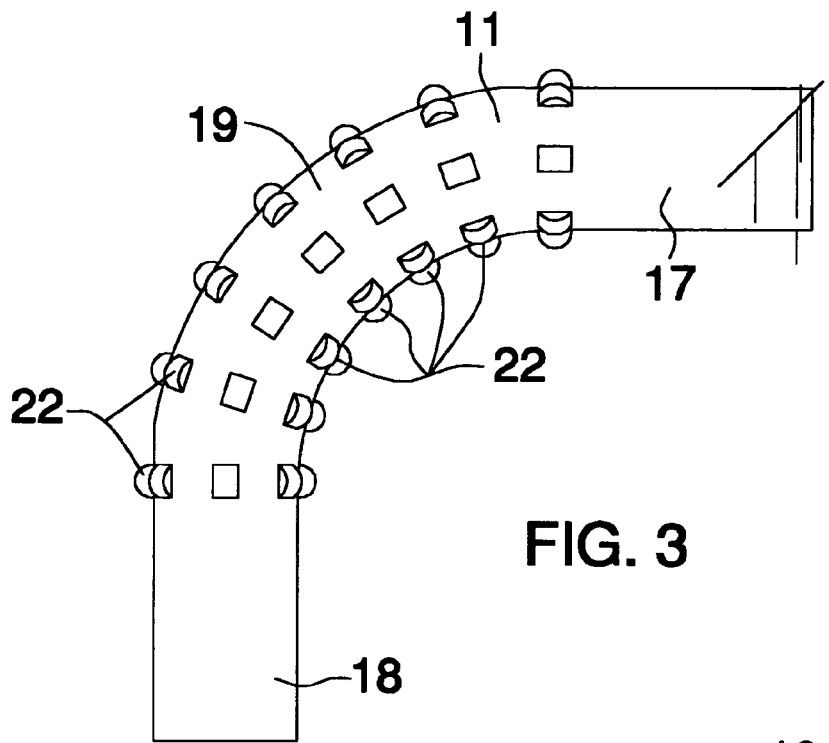
FIG. 3 is a side elevational view of a second embodiment of the present invention.
Figure 4:
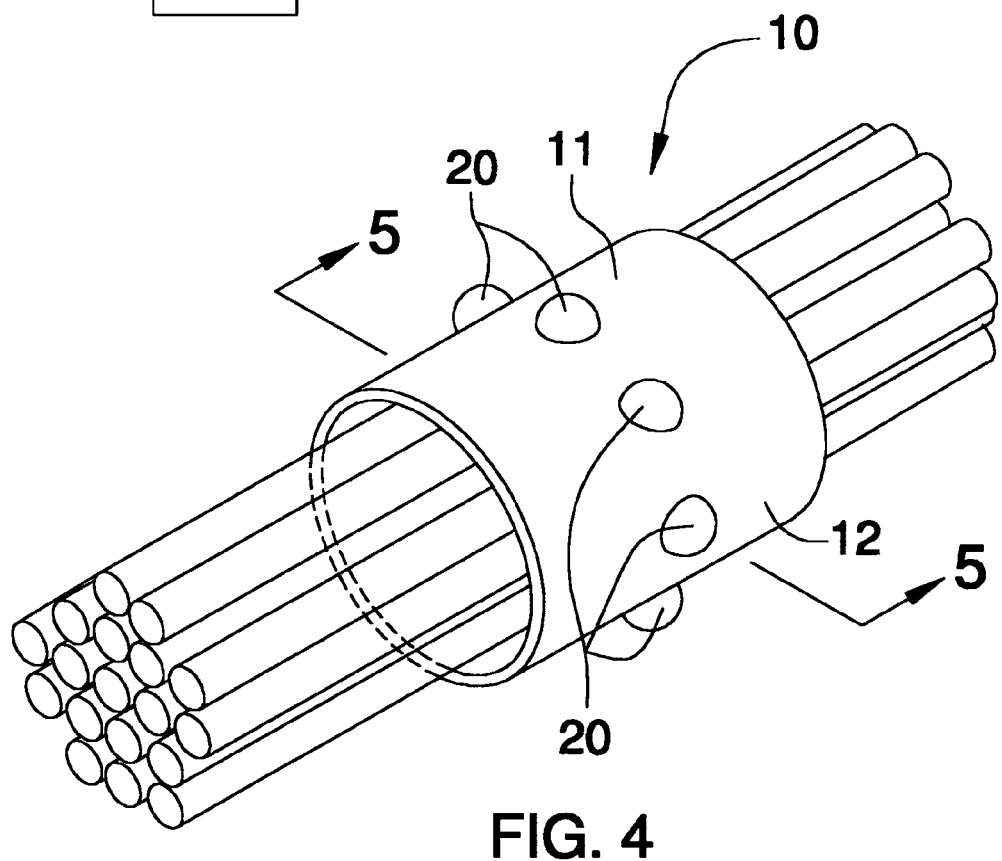
FIG. 4 is a perspective view of a third embodiment of the present invention.
Figure 6:
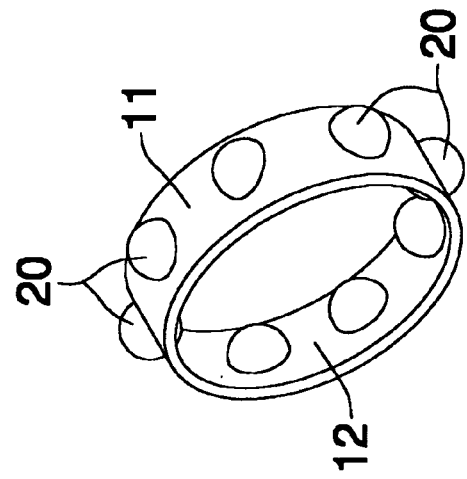
FIG. 6 is another perspective view of the third embodiment of the present invention.
Figure 7:
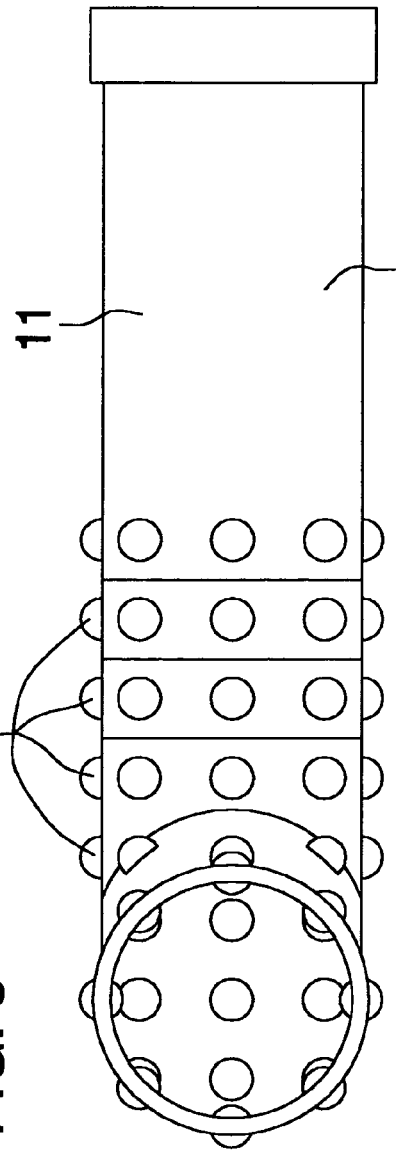
FIG. 7 is a side elevational view of a fourth embodiment of the present invention.
Figure 5:
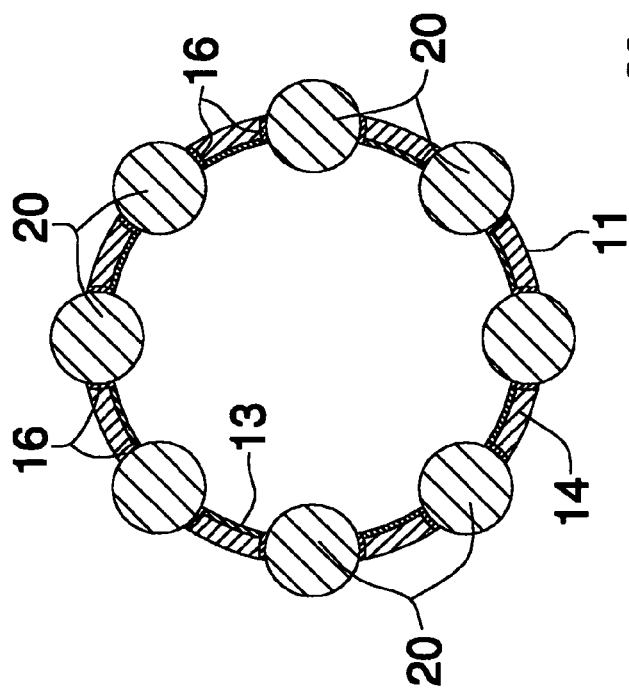
FIG. 5 is a lateral cross-sectional view of the third embodiment of the present invention.

With reference now to the drawings, and in particular to FIGS. 1 through 7 thereof, a new rollable conduit device embodying the principles and concepts of the present invention and generally designated by the reference numeral 10 will be described.

As best illustrated in FIGS. 1 through 7, the rollable conduit device 10 generally comprises a tubular conduit member 11 having open ends and a bore being disposed therethrough, and also having a selected thickness, and further having a plurality of holes 15 being disposed through a wall thereof with the wall having an inner layer 13 and an outer layer 14. The holes 15 are circumferentially-spaced and circumferentially-aligned about the tubular conduit member 11. As a second embodiment, the holes 15 are formed by concavity-shaped side walls 16.

Rollable assemblies are securely disposed in the holes 15 of the tubular conduit member 11 for facilitating moving of objects including electrical wires through the bore of the tubular conduit member 11. As a first embodiment, the rollable assemblies include a plurality of support axles 21 being securely disposed in side walls forming the holes 15, and also include a plurality of disc-shaped rollers 22 being securely and rotatably mounted about the support axles 21 and being disposed in the holes 15 with portions being disposed in the bore of the tubular conduit member 11 to facilitate movement of objects through the bore of the tubular conduit member 11. As a second embodiment, the tubular conduit member 11 is elbow-shaped having end portions 17,18 and a curved intermediate portion 19, and has a plurality of holes 15 being annularly aligned about the intermediate portion 19 of the tubular conduit member 11 with the rollers 22 being rollably-disposed therein to facilitate movement of objects through the tubular conduit member 11.

As a third embodiment, the rollable assemblies include a plurality of ball bearings 20 being securely seated in the holes 15 and having a portion being disposed in the bore of the tubular conduit member 11 and being adapted to be in rollable contact with objects being extended through the bore of the tubular conduit member 11. As a fourth embodiment, the tubular conduit member 11 is elbow-shaped having end portions and a curved intermediate portion, and has a plurality of holes 15 being annularly aligned about the intermediate portion of the tubular conduit member 11 with the ball bearings 20 being securely seated therein to facilitate movement of objects through the tubular conduit member 11.

In use, the user extends electrical wires through one end of the tubular conduit member 11 and the rollers 22 or the ball bearings 20 facilitate passage of the electrical wires through the bore of the tubular conduit member 11 and out the other end of the tubular conduit member 11 by rolling along with the electrical wires and providing no resistance and no friction to the electrical wires thus preventing breakage of the electrical wires as they are extended through the tubular conduit member 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the rollable conduit device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rollable conduit device wherein comprising:
   a tubular conduit member having open ends and a bore being disposed therethrough, and also having a selected thickness, and further having a plurality of holes being disposed through a wall thereof with said wall having inner and outer layers, said holes being circumferentially-spaced and circumferentially-aligned about said tubular conduit member, said holes being formed by concavity-shaped side walls; and
   rollable assemblies being disposed in said holes of said tubular conduit member for facilitating moving of objects including electrical wires through said bore of said tubular conduit member, said rollable assemblies including a plurality of ball bearings being seated in said holes and having a portion being disposed in said bore of said tubular conduit member and being adapted to be in rollable contact with objects being extended through said bore of said tubular conduit member.

2. The rollable conduit device as described in claim 1, wherein said tubular conduit member is elbow-shaped having end portions and a curved intermediate portion, and has a plurality of holes being annularly aligned about said intermediate portion of said tubular conduit member with said ball bearings being seated therein to facilitate movement of objects through said tubular conduit member.

* * * * *